US005170940A

United States Patent [19]

Salber et al.

[11] Patent Number: 5,170,940

[45] Date of Patent: Dec. 15, 1992

[54] HYDRAULIC REMOTE CONTROL DEVICE FOR AN APPARATUS, PARTICULARLY A HIGH PRESSURE CLEANER

[75] Inventors: Remy Salber, Strasbourg; Daniel Beaute, Ostwald, both of France

[73] Assignee: Comptoir de l'Injection Diesel et Appareillage Electrique C.I.D.A.P.E. (S.A.), Strasbourg, France

[21] Appl. No.: 680,122

[22] Filed: Apr. 3, 1991

[30] Foreign Application Priority Data

Apr. 3, 1990 [FR] France ................................ 90 04493

[51] Int. Cl.[5] ........................... B08B 3/02; F15B 1/00; F04B 49/08; G05D 27/00

[52] U.S. Cl. ..................................... 239/135; 239/526; 239/533.1; 239/583

[58] Field of Search ............... 239/101, 525, 526, 532, 239/533.1, 533.15, 570, 571, 583, 135

[56] References Cited

U.S. PATENT DOCUMENTS

| | | | |
|---|---|---|---|
| 2,754,153 | 7/1956 | Barthod | 239/526 |
| 3,246,845 | 4/1966 | Techler et al. | 239/526 |
| 3,628,727 | 12/1971 | Gjerde | 239/571 |
| 3,885,739 | 5/1975 | Tuttle | 239/526 |
| 4,013,225 | 3/1977 | Davis | 239/532 |
| 4,613,074 | 9/1986 | Schulze | 239/1 |

FOREIGN PATENT DOCUMENTS

| | | | |
|---|---|---|---|
| 0143439 | 6/1985 | European Pat. Off. . | |
| 1148628 | 4/1985 | U.S.S.R. | 239/526 |

*Primary Examiner*—Andres Kashnikow
*Assistant Examiner*—Karen B. Merritt
*Attorney, Agent, or Firm*—Young & Thompson

[57] ABSTRACT

A hydraulic remote control device for a high pressure cleaner comprises a flexible hose (2) equipped with a control device (3) for starting and stopping the operation of the controlled apparatus (1) and, for example, a cleaning lance (4). A programming device (5) is also mounted in series with the flexible hose (2) upstream or downstream of the control device (3), as well as a treatment unit (6), permanently raising in a stepwise manner the pressure in the flexible hose (2) by means of a corresponding transducer (7). The treatment unit controls particularly the operation of a motor-pump group (8) feeding the flexible hose (2) with fluid under pressure, as well as the nature and composition of the fed fluid, as a function of the pressure or of the progression of the raised pressure in the flexible hose (2).

6 Claims, 3 Drawing Sheets

FIG. 2
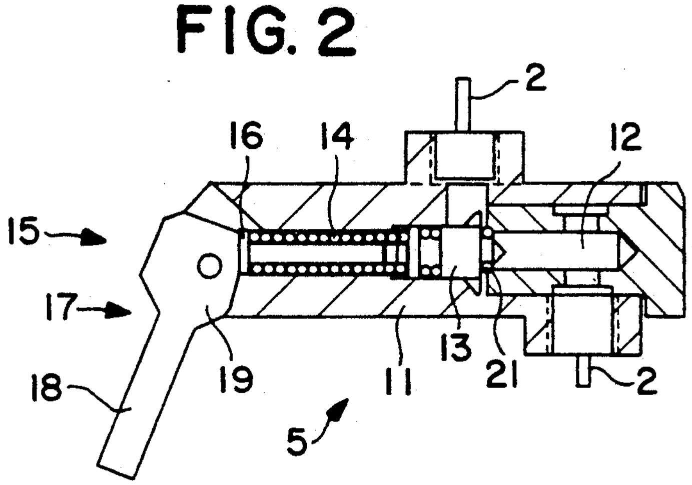
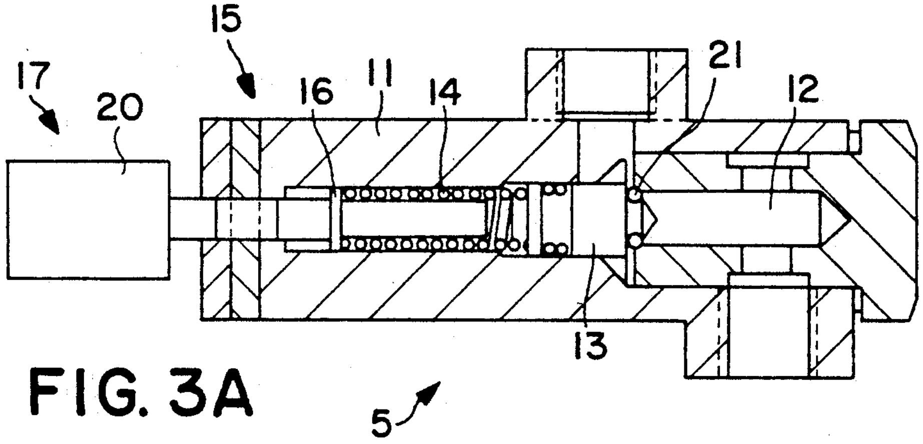
FIG. 3A
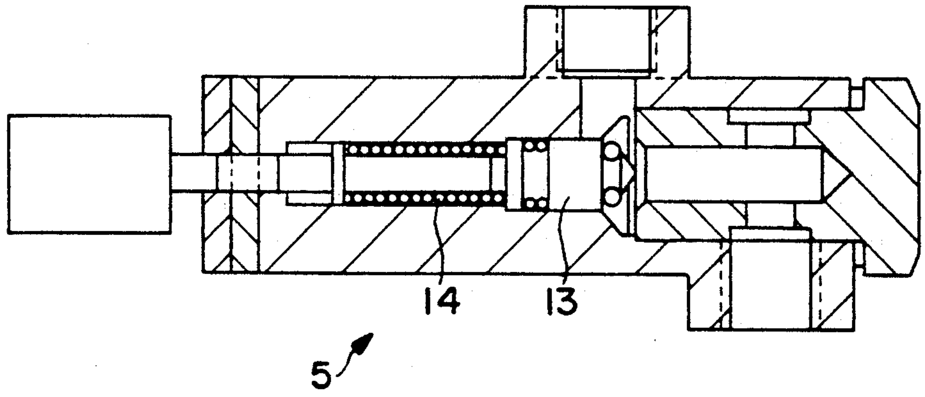
FIG. 3B

HYDRAULIC REMOTE CONTROL DEVICE FOR AN APPARATUS, PARTICULARLY A HIGH PRESSURE CLEANER

BACKGROUND OF THE INVENTION

1. Field of the Invention

The present invention relates to the field of remote control of apparatus, and has for its object a hydraulic remote control device of an apparatus, particularly a high pressure cleaner.

2. Description of the Prior Art

At present, there are three principal remote control systems for high pressure cleaners, namely control by mechanical gun, control by wires and radio control.

Control by a high pressure mechanical gun is the most widespread system. The control is in this case controlled by hydraulic components and requires precise mechanical regulation as well as very good sealing of the hydraulic circuit, no protection against small leakage of water being provided.

A malfunction of the hydraulic system can give rise to discontinuities in the operation of the cleaner and, under certain conditions, give rise to incidents having serious consequences for the user and the cleaner.

Finally, this system permits only control of the starting and stopping of the cleaner and accordingly has the drawback of not permitting remote control of the different functions of the cleaner, such as selection of cold water only, hot water only or again hot water with a washing product. Stated another way, to change the mode of operation of the cleaner, it is necessary to revert to the machine.

Electric remote control by wire is another remote control mode for a cleaner. Remote control of the operations is ensured by a special high pressure hose, so-called twinned, which is to say having an electrical sheath with several conductive wires, associated with a high pressure conduit. As a result, the arrangement of this flexible conduit makes it burdensome. It is also fragile and difficult to manipulate because of its weight and its rigidity.

On the other hand, the remote control gun has the same drawbacks as the flexible sheath, namely susceptibility to shocks, limited maneuverability and high cost.

Finally, the cleaner is entirely stopped upon breakdown of one of the elements of the system and no longer satifies among other things the existing safety standards.

The third and last remote control measure existing for high pressure cleaners is remote control by radio frequency signals. This control principle permits remote control of the different operations of the cleaner through a conventional high pressure hose. Thus, the control is effected thanks to coded radio frequency emission, transmitted by means of the woven metallic sheath of the flexible hose. As soon as the user pulls the trigger, the emission becomes continuous and its radiation may adversely affect the environment of the flexible hose. The emission and reception may be disturbed in turn, and as a result bring about random stoppages of the cleaner, independently of the will of the user. In certain cases, the remote control will be impossible, for example when the environment of the cleaner is too disturbed. Moreover, the frequency of usage permits no faulty contact at the connection between the gun and the cleaner. As a result, it is necessary to safeguard the flexible hose from external moisture so as to protect against corrosion and prevent all contact between it and a metallic body risking interruption of transmission. This control system is difficult and requires moreover for its operation electric batteries which must be regularly recharged. Furthermore, it also has the drawback of preventing utilization of the cleaner in case of disturbance of emission and/or of reception and of being limited by the range of radio frequency emission.

Finally, remote control by electric wires and by radio frequency signals has also the drawback of not being able completely to shut off flow, particularly when the cleaner is stopped while using hot water or vapor phase.

SUMMARY OF THE INVENTION

The present invention has for its object to overcome all the above drawbacks.

It thus has for its object a hydraulic remote control device for an apparatus, particularly a high pressure cleaner, characterized in that it is principally constituted on the one hand by a flexible hose comprising a device for controlling the starting and stopping of operation of the controlled apparatus and, as the case may be, a cleaning lance, on the other hand, by a programming device also mounted in series with the flexible hose upstream or downstream of the control device, integrated or not in said control device, and, finally, by a treatment unit, permanently increasing stepwise the pressure in the flexible hose by means of a corresponding transducer, and controlling particularly the operation of a motor-pump group feeding said flexible hose with fluid under pressure, as well as the nature and composition of said feed fluid, as a function of the pressure or of the course of pressure increase in said flexible hose.

BRIEF DESCRIPTION OF THE DRAWINGS

The invention will be better understood from the following description which relates to a preferred embodiment, given by way of non-limiting example, and explained with reference to the accompanying schematic drawings, in which:

FIG. 2 is a side elevational view in cross section of the programming device which is a part of the remote control device shown in FIG. 1, said programming device being shown at rest and programmed for a predetermined washing phase;

FIG. 3 (FIGS. 3A and 3B) show side elevational views in cross section of the programming device shown in FIG. 2, respectively at rest and in the working stage of the cleaner, said programming device being controlled for another washing phase, and FIG. 4 (FIGS. 4A, 4B, 4C and 4D) show diagrams of the pressure variation in the flexible hose during manipulation of the cleaner by the user.

DETAILED DESCRIPTION OF PREFERRED EMBODIMENTS

Figure 1:
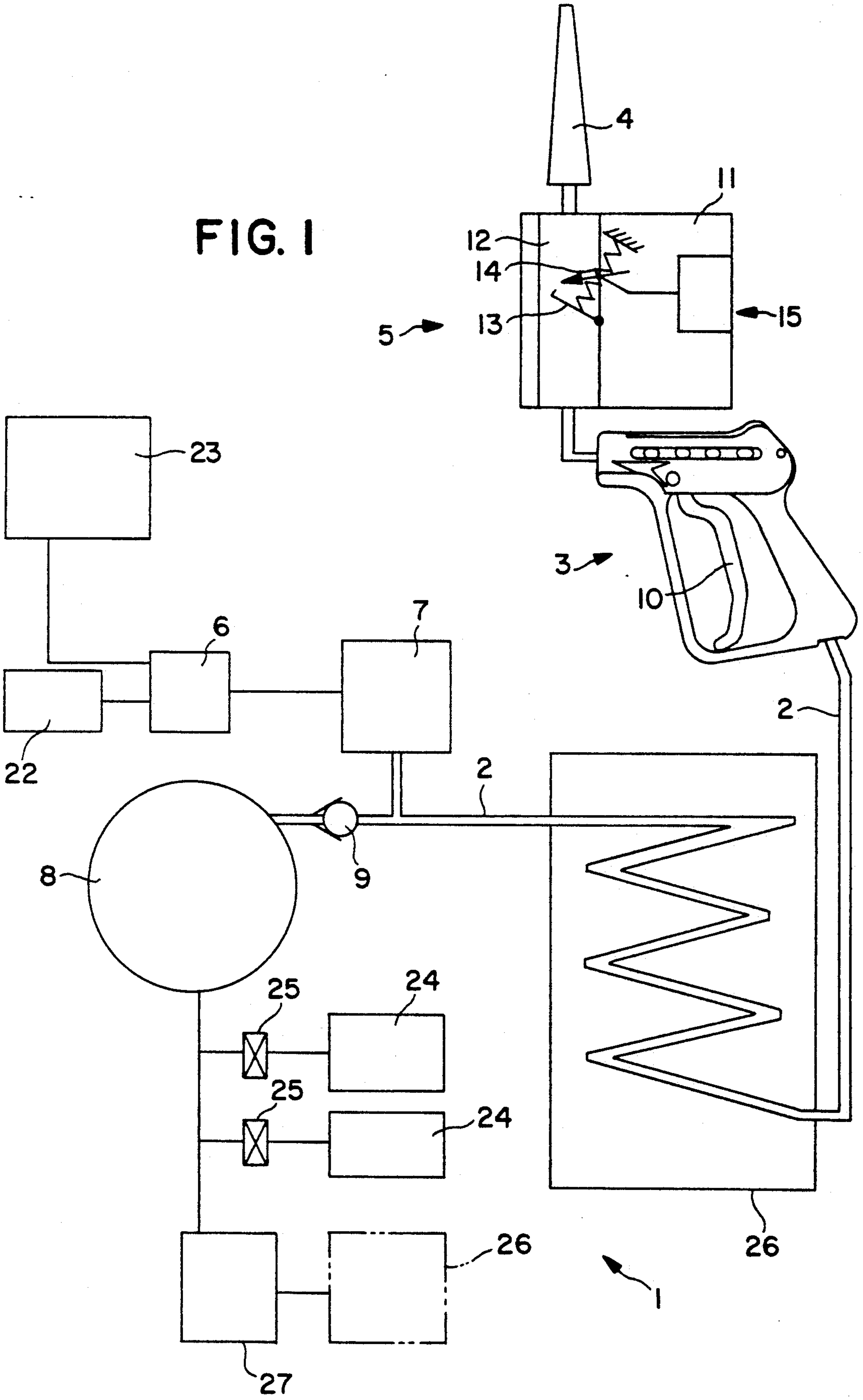
FIG. 1 is a schematic view of the assembly of the remote control device of the invention according to a preferred embodiment, used for the remote control of high pressure cleaner.

According to the invention, and as shown in FIG. 1 of the accompanying drawings, the remote control device is principally constituted on the one hand by a flexible hose 2 comprising a control device 3 of the starting and stopping of the operation of the apparatus to be controlled, and, as the case may be, a cleaning lance 4, and on the other hand, by a programming device 5 also mounted in series with the flexible hose 2 upstream or downstream of the control device 3, integrated or not in said control device 3, and, finally, by a treatment unit 6, permanently raising stepwise the pressure in the flexible hose 2 by means of a corresponding transducer 7, and controlling particularly the operation of a motor-pump group 8 feeding said flexible hose 2 with fluid under pressure, as well as the nature and the composition of said feed fluid, as a function of the pressure or the development of the raised pressure in said flexible hose 2.

Thus, the treatment unit 6 controls, in an automatic manner, on the one hand, the starting of the motor pump group 8, by means of a corresponding interface (not shown), as soon as the pressure in the flexible hose 2 stabilizes at a predetermined value, lower than the working pressure, or falls below the lowest of a group of predetermined pressure values and, on the other hand, the stopping of the motor-pump group 8, as soon as the pressure in the flexible hose 2 achieves and/or exceeds another predetermined value, higher than the working pressure.

According to a first characteristic of the invention, also shown in FIG. 1 of the accompanying drawings, the control device 3 is in the form of a mechanical high pressure gun, coacting with at least one non-return valve 9, disposed downstream of the pump of the motor-pump group 8, or integrated with the latter.

Actuation of the trigger 10 results in a fall of pressure within the flexible hose 2 and thereafter the starting of the motor-pump group 8 by the treatment unit 6, while the release of said trigger 10, by preventing flow of fluid under pressure through the flexible hose 2, results in a rapid increase of the pressure in said flexible hose 2, and as a result, stopping of the motor pump group 8 by the treatment unit 6.

But the non-return valve or valves 9, by coacting with the mechanical high pressure gun 3, permit after stopping of the motor pump group 8 following release of the trigger 10, the maintenance of the pressure in that portion of the flexible hose 2 between the mechanical gun 3 and the non-return valve or valves 9, at a value higher than the working pressure or at least higher than the values resulting in automatic resumption of operation of the motor-pump group 8 by the treatment unit 6 and this until renewed actuation of the trigger 10 of the mechanical gun 3 by the user.

As is also shown in FIG. 1 of the accompanying drawings, the programming device 5 is principally constituted on the one hand by a support body 11 provided with a conduit 12 through which passes the fluid under pressure, and on the other hand by a movable member 13 closing said conduit 12 under the action of an elastic member 14 and, finally, by a control device 15 of the force of the pressure of said elastic means 14, said programming device 5 thus permitting, after actuation of the mechanical gun 3, the maintenance of the pressure in the flexible hose 2 at a pre-programmed value less than the working pressure, determining the nature and the composition of the feed fluid of the flexible conduit 2 during the next phase of operation of the apparatus 1.

Thus, the drop in pressure in the flexible hose 2, following actuation of the trigger 10 of the mechanical gun 3, will be limited, and said fluid pressure will tend to achieve a threshold value, equal to the force of pressure applied by the elastic member 14 on the movable closure member 13 and whose value is fixed by the user by the control device 15, prior to actuation of said trigger 10. This stabilization of the pressure in the flexible hose 2 at a pre-programmed value, is marked by the treatment unit 6 thanks to the sequential pressure increases brought about by means of the transducer 7, the value of the pressure threshold determining the characteristics such as for example temperature, nature or also composition, of the feed fluid injected in the flexible hose 2 by the motor pump group 8, which is started as soon as the existence of a pressure threshold has been verified and its value acquired by the treatment unit 6.

According to a preferred embodiment of the invention, shown in FIGS. 2, 3A and 3B of the accompanying drawings, the movable member 13 and the elastic member 14 are respectively in the form of a slidable pointer, if desired provided with a toric seal 21, and a calibrated spring, the regulating device being preferably in the form of a bearing member 16 of said movable spring 14, whose position is determined by a control member 17 of several positions. This latter may be in the form for example of a control lever 18 provided with an eccentrically mounted cam 19 (FIG. 2) or else in the form of a button 20, whose pressure member may be more or less sunk within the support body 11 (FIGS. 3A and 3B). Thus, there corresponds to a more or less compressed spring 14 a pressure force of the pointer 13 subject to greater or lesser pressure in the conduit 12 and, as a result, a higher or lower threshold value or degree of pressure.

According to a supplemental characteristic of the invention, and as shown also in FIG. 1 of the accompanying drawings, the remote control device of the apparatus 1 comprises also a control panel 22 for programming the values of the parameters defining the nature and composition of the feed fluid, as well as a display device 23 of these values and of informative messages during use of the apparatus 1, the acquisition of the programmed parameters and the control of the display being effected by the treatment unit 6.

When the apparatus to be controlled is a high pressure cleaner, the feed fluid is principally water. The treatment unit 6 thus controls the injection, in the feed fluid, from a reservoir 27 for example, of additional product such as, for example, cleaning product, anti-tartar, etc. . . . from corresponding reservoirs 24, by controlled opening and closing devices 25 such as, for example, electro-valves. Moreover, the treatment unit 6 may also control the operation of a heating device 26 for the feed fluid disposed upstream or downstream of the motor-pump group 8 and shown respectively in broken lines and full lines on FIG. 1 according to its arrangement.

Preferably, the control member 17 can have three different positions, corresponding to three thresholds of pressure, of which one can be zero bar, and, as a result, corresponding to three consecutive operational modes of the apparatus differing by, for example, a threshold value higher than or equal to 20 bars for operation with cold water, a threshold value lower than 20 bars for operation with hot water and, finally, a pressure drop less than 10 bars without a manifestation of a threshold, for operating with hot water with an added cleaning product. The heating temperature of the water as well as the concentration of cleaning product are, as the case may be, previously set by means of the programming control panel 22.

An example of operation of the device according to the invention will now be described with reference to FIGS. 4A to 4D, showing the pressure in the flexible hose during the period of use of a high pressure cleaner comprising said remote control device.

Figure 4A:
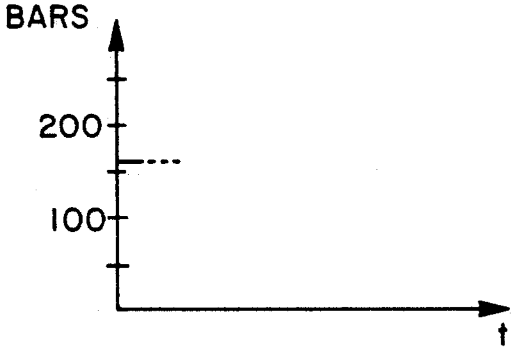

In the course of normal operation, the pressure in the flexible hose 2 is constant and equal to the working pressure, 160 bars in the case of FIG. 4A, and this is true as long as the trigger 10 is pulled by the user (FIG. 4A).

Figure 4B:
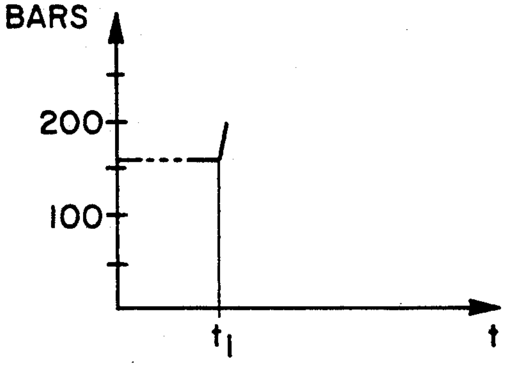

If at time $t_1$, the user releases the trigger 10, the flow of feed fluid in the flexible hose 2 is stopped at the mechanical gun 3. The pressure in the flexible hose 2 thus climbs rapidly (FIG. 4B).

Figure 4C:
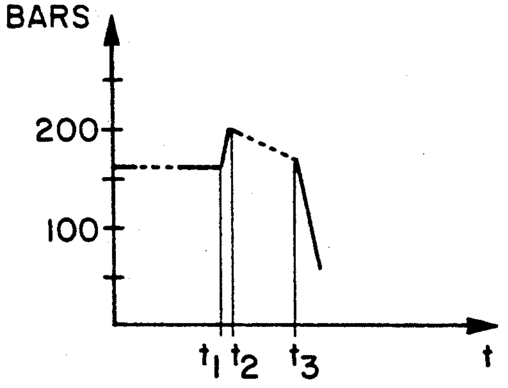

At $t_2$, the pressure achieves a maximum permitted value and the treatment unit 6 accordingly stops the operation of the motor pump group 8. This pressure is maintained in the portion of the flexible hose 2 between the non-return valve or valves 9 and the mechanical gun 3. Nevertheless, a slight loss of pressure is inevitable if the time period $t_2$–$t_3$ is great. At time $t_3$, the user again actuates the trigger 10 and the pressure then falls rapidly in the flexible hose 2 because the blockage is removed that had theretofore been provided by the mechanical gun 3 (FIG. 4C).

Figure 4D:
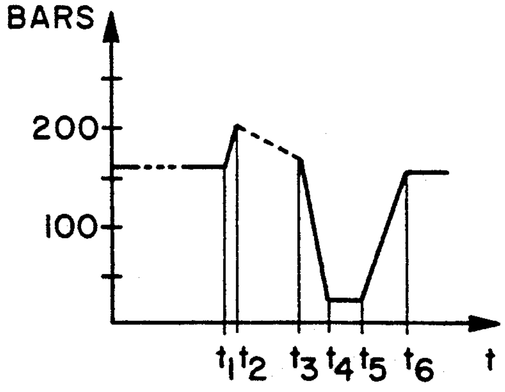

At time $t_4$, the value of the pressure in the flexible hose will be equal to or slightly less than the value of the pressure exerted by the elastic member 14 on the movable member 13 which then obstructs the conduit 12 of the programming device 5, from which results a stabilization of the pressure in the flexible hose 2 at a threshold value of about 20 to 25 bars in the case of FIG. 4D, preset by means of the control device 15. The existence of this pressure threshold as well as its value are taken account of by the treatment unit 16 which decides therefrom very rapidly the mode of operation of the apparatus 1 in the following working phase. The motor-pump group 8 is then returned to operation by the treatment unit, fed by the fluid whose characteristics have been determined by the threshold pressure. From $t_5$, the pressure rises rapidly in the flexible hose 2 to achieve once more at $t_6$ the working pressure.

The control device according to the invention is also capable of protecting the apparatus 1 against tiny losses when said apparatus 1 is on standby, which is to say when it is under pressure but not used. Thus after a certain number of operations of the motor pump group 8 followed each time by an immediate stoppage, by a blockage of fluid in the flexible hose by the non-actuated mechanical gun 3, the treatment unit 6 places the apparatus 1 on standby.

In case of failure of the programming device 5, this latter does not prevent the operation of the apparatus 1. Thus, the user will then have available a remote control of the apparatus 1 analogous to the conventional one, provided by means of a high pressure mechanical gun. The characteristics of the feed fluid will in this case be able to be determined directly by means of the control panel 22.

Moreover, the flow of fluid under pressure, in case of release of the trigger 10, is stopped cleanly because of the blockage provided by the mechanical gun 3.

Of course the invention is not limited to the embodiment described and shown in the accompanying drawings, modifications remaining possible, particularly as to the construction of the various elements or by substitution of technical equivalents, without thereby departing from the scope of protection of the invention.

We claim:

1. A hydraulic remote control device of an apparatus, comprising a flexible hose (2) equipped with a control device (3) for starting and stopping the operation of the controlled apparatus (1), a programming device (5) mounted in series with the flexible hose (2), and a treatment unit (6) for restoring stepwise the pressure in the flexible hose (2) by means of a corresponding transducer (7), said treatment unit (6) controlling starting and stopping of a motor-pump group (8) feeding said flexible hose (2) with fluid under pressure, as well as the nature and the composition of said feed fluid, as a function of the pressure or of the development of increased pressure in said flexible hose (2), said programming device (5) maintaining a predetermined residual pressure in said flexible hose (2) when said control device is actuated and said motor-pump group (8) is stopped.

2. The device according to claim 1, wherein the control device (3) is in the form of a high pressure mechanical gun, coacting with at least one non-return valve (9).

3. The device according to claim 2 wherein the programming device (5) comprises a support body (11 provided with a conduit (12) through which passes the fluid under pressure, a movable member (13) closing said conduit (12) under the action of an elastic member (14) and, a control device (15) for the force of the pressure of said elastic member (14), said programming device (5) thus permitting, after actuation of the mechanical gun (3), maintaining the pressure in the flexible hose (2) at said predetermined residual value less than the working pressure.

4. The device according to claim 3, wherein the movable member (13) and the elastic member (14) are respectively in the form of a sliding needle and a calibrated spring, the adjustment device (15) being in the form of a pressure member (16) of said movable spring (14), whose position is determined by a control member (17) with several positions.

5. The device according to claim 1, further comprising a control panel (22) for programming the values of the parameters defining the nature and composition of the feed fluid, as well as a display device (23) of these values and of information during use of the apparatus (1), acquisition of the programmed parameters and the management of the display being effected by the treatment unit (6).

6. The device according to claim 1, wherein the feed fluid is principally water, the treatment unit (6) controlling the injection into the feed fluid of additional products from corresponding reservoirs (24), by means of devices (25) for controlled opening and closing, and the heating of said feed fluid by a heating device (26) disposed in series with the motor-pump group (8).

* * * * *